US012799971B2

(12) United States Patent
Schleiter et al.

(10) Patent No.: US 12,799,971 B2
(45) Date of Patent: Nov. 17, 2026

(54) SELF-LOCKING STRUCTURE OF THREADED CONNECTION

(71) Applicant: TK ELEVATOR INNOVATION AND OPERATIONS GMBH, Düsseldorf (DE)

(72) Inventors: Georg Schleiter, Hamburg (DE); Martin Haag, Hamburg (DE); Reinhardt Krämer, Hamburg (DE); Randolf Thele, Kneese (DE); Benno Tresp, Bützow (DE); Moritz Tim Münchow, Barmstedt (DE)

(73) Assignee: TK ELEVATOR INNOVATION AND OPERATIONS GMBH, Düsseldorf (DE)

( * ) Notice: Subject to any disclaimer, the term of this patent is extended or adjusted under 35 U.S.C. 154(b) by 240 days.

(21) Appl. No.: 18/847,430

(22) PCT Filed: Mar. 16, 2023

(86) PCT No.: PCT/EP2023/056802
§ 371 (c)(1),
(2) Date: Sep. 16, 2024

(87) PCT Pub. No.: WO2023/175103
PCT Pub. Date: Sep. 21, 2023

(65) Prior Publication Data

US 2025/0215920 A1 Jul. 3, 2025

(30) Foreign Application Priority Data

Mar. 17, 2022 (CN) ......................... 202210265431.5

(51) Int. Cl.
*F16B 39/24* (2006.01)

(52) U.S. Cl.
CPC .................................... *F16B 39/24* (2013.01)

(58) Field of Classification Search
CPC ...... F16B 39/24; B66B 221/12; B66B 23/145
(Continued)

(56) References Cited

U.S. PATENT DOCUMENTS 6,405,848 B1 6/2002 Babler
9,802,791 B2 * 10/2017 Ludwig .................. B66B 23/12
(Continued)

FOREIGN PATENT DOCUMENTS

CN 200988725 Y * 12/2007
CN 107215761 A 9/2017
(Continued)

OTHER PUBLICATIONS

International Search Report and Written Opinion of Corresponding International Application No. PCT/EP2023/056802 mailed Jul. 3, 2023, 11 pages.

*Primary Examiner* — Jason D Shanske
(74) *Attorney, Agent, or Firm* — Dinsmore & Shohl LLP

(57) ABSTRACT

A self-locking structure of threaded connection for installing a step roller of an escalator on a step is provided. The step has a mounting shaft on which the step roller is installed through a rolling bearing; a threaded connection structure including a bolt, a washer and a nut, wherein the mounting shaft has a through hole along its axis line direction, the bolt passes through the washer, the through hole and the nut, and the washer presses the inner ring of the rolling bearing against the mounting shaft through the tightening engagement between the bolt and the nut. A countersunk slot hole for placing the nut is formed at the end of the through hole such that the bolt passes through the nut located in the countersunk slot hole. The sidewall of the countersunk slot hole includes a bottom face and two side faces forming a U-shaped structure.

4 Claims, 3 Drawing Sheets

(58) Field of Classification Search
USPC ........................................... 411/172; 198/333
See application file for complete search history.

(56) References Cited

U.S. PATENT DOCUMENTS

| | | | | |
|---|---|---|---|---|
| 2012/0325617 | A1* | 12/2012 | Gonzalez Alemany | B66B 23/12 198/333 |
| 2018/0179797 | A1* | 6/2018 | Bentzinger | E05D 15/165 |
| 2025/0207631 | A1* | 6/2025 | Thele | F16C 23/06 |

FOREIGN PATENT DOCUMENTS

| | | | | |
|---|---|---|---|---|
| CN | 107473052 | A | 12/2017 | |
| WO | WO-2009047146 | A1 * | 4/2009 | B66B 23/12 |
| WO | 2020011597 | A1 | 1/2020 | |

* cited by examiner

SELF-LOCKING STRUCTURE OF THREADED CONNECTION

CROSS REFERENCE TO RELATED APPLICATIONS

The present application is the National Phase entry of International Patent Application PCT/EP2023/056802, filed Mar. 16, 2023, which in turn claims priority benefit to Chinese Patent Application 202210265431-5, filed Mar. 17, 2022, the entire contents of both which are hereby incorporated by reference into this application.

TECHNICAL FIELD

The present disclosure relates to an installation structure of a step roller assembly of an escalator, particularly to a step roller assembly assembled in a self-locking threaded connection.

BACKGROUND

FIG. 1 illustrates an escalator and its die-casted step 1, with the partial enlarged view showing the installation position of a step roller 2. FIG. 2 illustrates a mounting shaft 3 for mounting a rolling bearing.

As shown in FIG. 1, the escalator includes many die-casted steps 1. Each die-casted step 1 has a mounting shaft 3 on both sides. The step roller 2 is installed on the mounting shaft 3 through a rolling bearing, wherein an inner ring of the rolling bearing is installed on the radial outer surface of the mounting shaft 3, and an outer ring of the rolling bearing can be installed on the inner surface of an inner hole of the step roller 2.

The step roller 2 is fixed to the mounting shaft 3 with the connection composed of standard mechanical components (e.g., a bolt, a washer, and a nut).

For a traditional step roller assembly of an escalator, in the assembly process, it is necessary to screw one of the bolt and the nut while fixing the other, so the assembly operation is inconvenient, resulting in low production efficiency, thus increasing the product cost. In addition, since the fit between the nut and the bolt may loosen for various reasons, such as vibration, it would lead to loosening of nut and thus failure. The information disclosed in the background part of the present disclosure is only intended to strengthen the understanding of the general background technology of the present disclosure, and shall not be deemed to recognize or imply in any form that the information constitutes the prior art known to those skilled in the art.

SUMMARY

The present disclosure aims to provide a step roller assembly of an escalator, which can conveniently and accurately position nuts during assembly, so as to improve the production efficiency and reduce the cost, and prevent the failure caused by the loosening of nuts.

Specifically, the disclosure provides a self-locking structure of threaded connection for installing a step roller of an escalator on a step, including:

the step having a mounting shaft on which the step roller is installed through a rolling bearing, wherein the inner ring of the rolling bearing is installed on the mounting shaft, and the step roller is installed on the outer ring of the rolling bearing, a threaded connection structure including a bolt, a washer and a nut, wherein the mounting shaft has a through hole along its axis line direction, the bolt passes through the washer, the through hole and the nut, and the washer presses the inner ring of the rolling bearing on the mounting shaft through the tightening engagement between the bolt and the nut, wherein a countersunk slot hole for placing the nut is formed at the end of the through hole such that the bolt passes through the nut located in the countersunk slot hole, the sidewall of the countersunk slot hole includes a bottom face and two side faces symmetrical to each other, thereby forming a U-shaped structure in which three sides of the sidewall are closed and one side is open, and when the nut falls in the U-shaped structure and is positioned by the bottom face and the two sides, the hole of the nut is exactly aligned with the through hole.

In the above self-locking structure of threaded connection, the countersunk slot hole may further include a rib which protrudes from the outer end of the bottom face to cover a part of the countersunk slot hole with the aim of being an axial limit stop for the nut. In the above self-locking structure of threaded connection, the step is a die-casted step formed by die-casting, and the countersunk slot hole is integrally die-casting molded with the step. Further, in other embodiments, the die-casted step is molded by die-casting of castable metallic materials, such as, without limitation and as an example only, metal aluminum or aluminum alloy.

With the help of the self-locking structure of threaded connection of the present disclosure, the step roller assembly of the escalator can be assembled quickly and simply, which shortens the assembly time and thus reduce the product cost. Moreover, the self-locking structure of threaded connection of the present disclosure also has the function of preventing the loosening of the threaded connection, thereby improving the reliability of the escalator.

Since the step of the escalator is molded by die-casting of castable metallic materials, such as, without limitation, metal aluminum or aluminum alloy, with the help of the easy die-casting characteristics of castable metallic materials, good molding accuracy can be ensured with high production efficiency. The castable metallic materials also has good strength performance and light weight, which helps to reduce weight, reduce operating energy consumption and ensure sufficient mechanical strength.

The method and apparatus of the present disclosure has other features and advantages that will be apparent from the drawings incorporated herein and subsequent detailed embodiments, or will be set forth in detail in the drawings incorporated herein and subsequent detailed embodiments, which are jointly used to explain the specific principles of the present disclosure.

Figure 1:
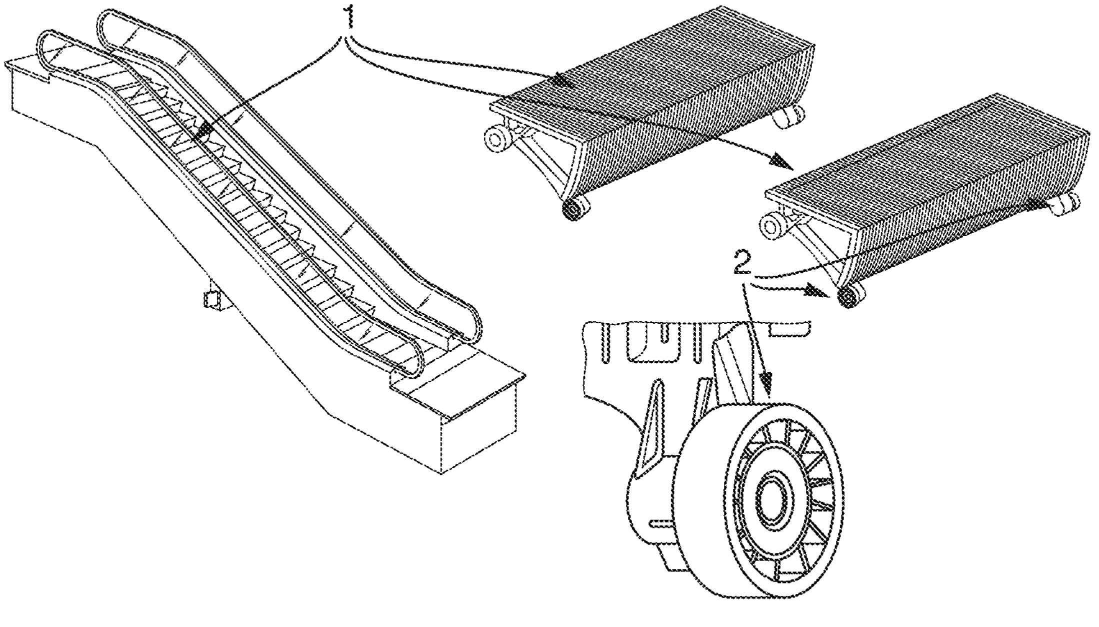
FIG. 1 schematically illustrates an escalator, step structure of an escalator, and installation position of a step roller on a step.
Figure 2:
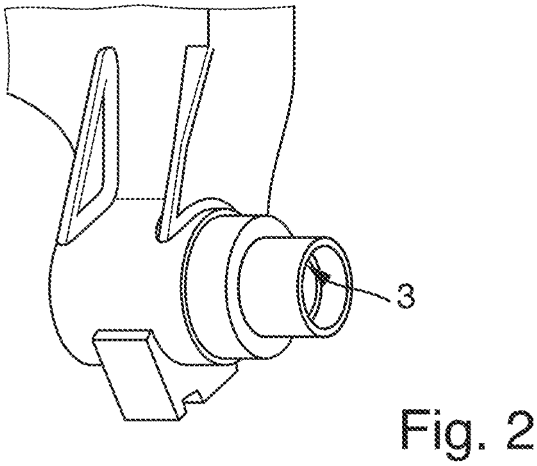
FIG. 2 schematically illustrates a mounting shaft of a step for mounting a rolling bearing.

It should be understood that the drawings are not necessarily to be drawn to scale, but show various features of the basic principles of the present disclosure, which have been simplified to some extent. The specific design features of the present disclosure disclosed herein, including, for example, specific dimensions, orientation, positioning and shape, will be determined in part by the application and use environment for a specific purpose.

In these drawings, in a plurality of figures throughout the drawings, reference numerals refer to the same or equivalent parts of the present disclosure.

DETAILED DESCRIPTION OF EMBODIMENTS

Specific reference will now be made to various embodiments of the present disclosure, and examples of these embodiments are shown in the drawings and the following description. Although the present disclosure is described in combination with exemplary embodiments, it should be understood that this description is not intended to limit the present disclosure to those exemplary embodiments. On the contrary, the present disclosure is intended to cover not only these exemplary embodiments, but also various alternatives, modifications, equivalent forms and other embodiments that may be included within the spirit and scope of the present disclosure as defined by the appended claims.

Figure 3:
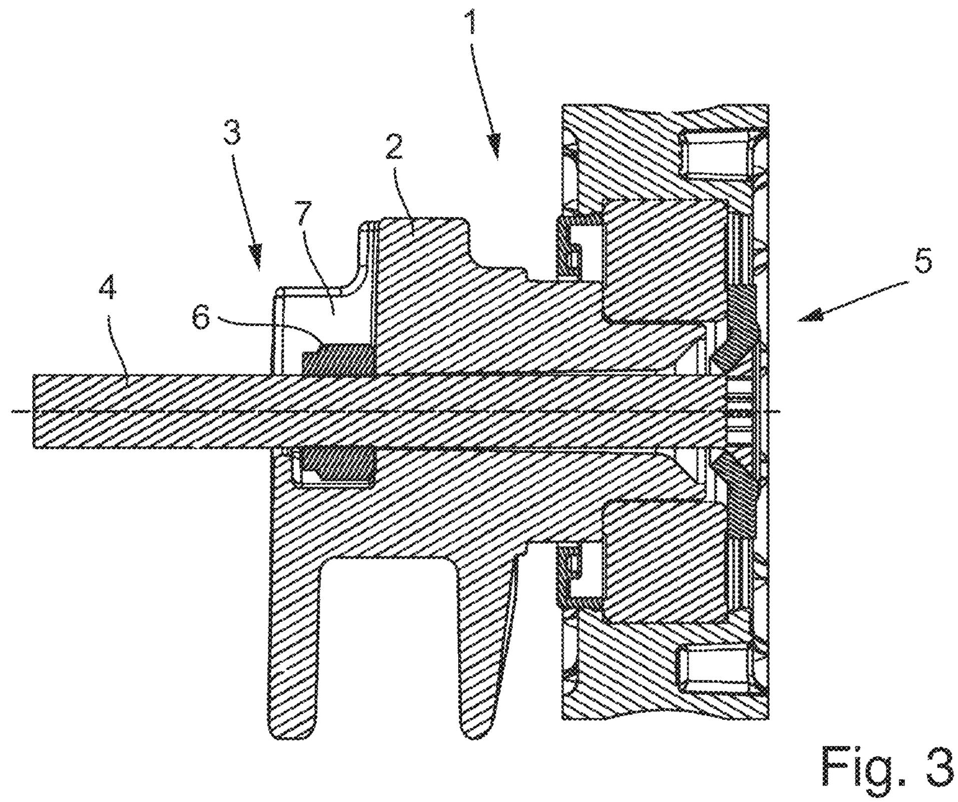
FIG. 3 schematically depicts a sectional view showing an assembly structure in which a step roller of an escalator according to the present disclosure is installed on a die-casted step.

FIG. 3 is a sectional view showing an assembly structure in which a step roller of an escalator according to the present disclosure is installed on a die-casted step.

The step of the present disclosure is a die-casted step, such as, and without limitation, a die-casted step molded by die-casting of castable metallic materials, such as, without limitation, metal aluminum or aluminum alloy. The castable metallic materials is easy to die cast, and can ensure good molding accuracy with high production efficiency. The castable metallic materials also has good strength performance and light weight, which helps to reduce weight, reduce operating energy consumption and ensure sufficient mechanical strength.

As shown in FIG. 3, the step roller 2 of the escalator is installed on the mounting shaft 3 of the die-casted step 1 through a rolling bearing. The bolt 4 passes through the washer 5, the through hole of the die-casted step 1 and the nut 6, and the washer 5 presses the inner ring of the rolling bearing against the mounting shaft 3 of the die-casted step 1 by tightening engagement between the bolt 4 and the nut 6.

Figure 4:
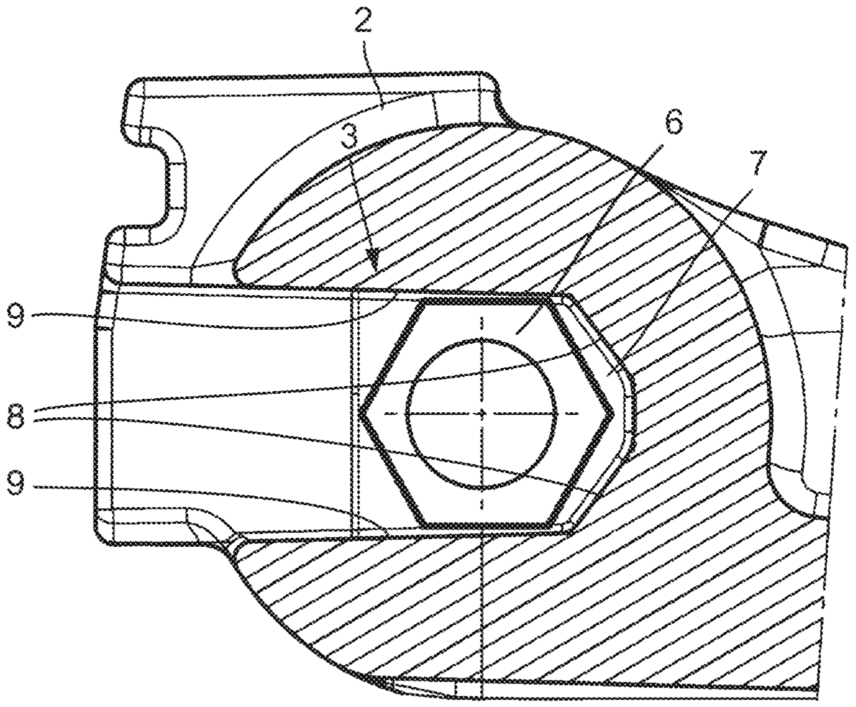
FIG. 4 schematically illustrates the positional relationship in which a nut is embedded in the slot of a step in the assembly relationship shown in FIG. 3.
Figure 5:
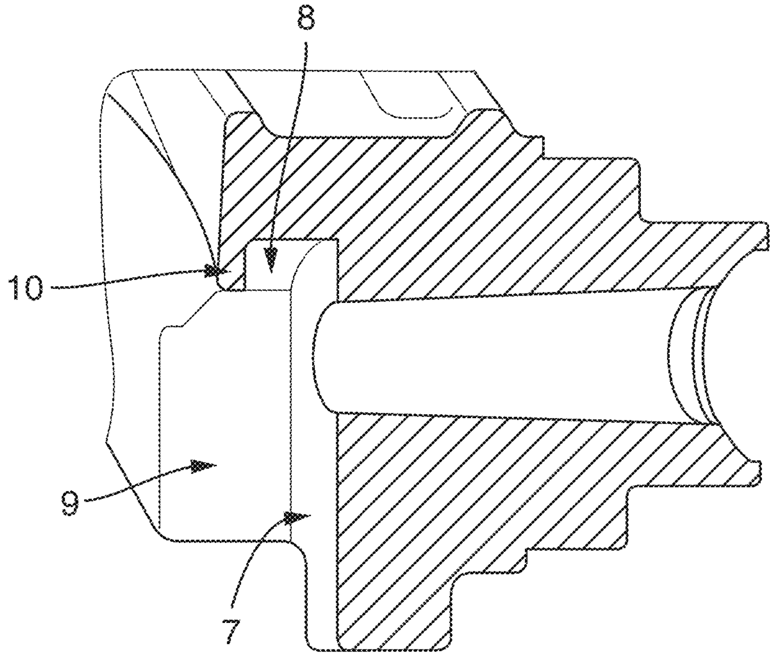
FIG. 5 schematically depicts a sectional view showing a countersunk slot hole for a self-locking nut on a die-casted step of an escalator according to the disclosure.

With reference to FIGS. 4, 5, it can be seen that the nut 6 of the present disclosure is embedded in the countersunk slot hole 7 formed on the die-casted step 1. As shown in FIGS. 4, 5, the countersunk slot hole 7 is formed at the end of the through hole of the die-casted step 1 such that the bolt 4 can pass through the nut 6 located in the countersunk slot hole 7.

The sidewall of the countersunk slot hole 7 includes a bottom face 8 and two side faces 9 symmetrical to each other, and both ends of the bottom face 8 are connected with one side face 9, respectively, thereby forming a U-shaped structure with three closed sides and one open side of the sidewall. The shape of the U-shaped structure matches the side shape of the nut such that when the nut is placed in the U-shaped structure and is positioned by the bottom face 8 and the two side faces 9, the hole of the nut is exactly aligned with the through hole of the die-casted step 1.

Due to the positioning effect of the U-shaped structure on the nut, the nut can be conveniently placed in an accurate position during assembly, and during the assembly, only the bolt is tightened without adjusting the radial position of the nut, such that the assembly efficiency is improved.

Since the shape of the U-shaped structure matches the side shape of the nut, the two sides 9 restrict the rotation of the nut, such that the nut is prevented from loosening in use, thus playing a self-locking role. Therefore, the die-casted step 1 with the countersunk slot hole 7 forms a self-locking structure of threaded connection together with the bolt 4, the washer 5 and the nut 6.

A rib 10 can be provided at the bottom face 8 close to the outer end of the countersunk slot hole 7. That is, the rib 10 protrudes from the outer end of the bottom face 8 to cover a part of the countersunk slot hole 7.

The rib 10 prevents axial displacement of the nut 6 during tightening. Once the first thread of the bolt 4 begins to engage with the nut 6, the nut 6 can no longer disengage from its desired position. Since there is no need to worry about the axial displacement of the nut, the assembly efficiency is further improved. That is, during assembly, the bottom face 8, the two side faces 9 and the rib 10 of the countersunk slot hole 7 define the position of the nut in both radial direction and axial direction. In this way, when preparing for assembly, just by placing the nut from the open side of the U-shaped structure of the countersunk slot hole 7, accurate axial and radial positioning of the nut can be realized.

The structure of the countersunk slot hole 7 (including the rib 10) of the present disclosure is directly formed in the step by a die-casting die. Its structure is conducive to efficient and high-precision molding. This not only ensures the manufacturing efficiency, but also reduces the production cost.

The foregoing description of the specific exemplary embodiments of the present disclosure is for the purpose of explanation and description. The foregoing description does not want to be exhaustive, nor to limit the present disclosure to the precise form disclosed. Obviously, many changes and variations are possible according to the above teaching. The purpose of selecting and describing exemplary embodiments is to explain the specific principles and practical applications of the present disclosure, so that other skilled persons in the art can realize and utilize various exemplary embodiments of the present disclosure and various selection forms and modification forms. The scope of the present disclosure is intended to be defined by the appended claims and their equivalent forms.

The invention claimed is:

1. A self-locking structure of threaded connection for installing a step roller of an escalator on a step, comprising:
   - the step having a mounting shaft on which the step roller is installed through a rolling bearing, wherein an inner ring of the rolling bearing is installed on the mounting shaft, and the step roller is installed on an outer ring of the rolling bearing,
   - a threaded connection structure comprising a bolt, a washer and a nut,
   - wherein the mounting shaft has a through hole along its axis line direction, the bolt passes through the washer, the through hole and the nut, and the washer presses the inner ring of the rolling bearing against the mounting shaft through the tightening engagement between the bolt and the nut, wherein a countersunk slot hole for placing the nut is formed at the end of the through hole such that the bolt passes through the nut located in the countersunk slot hole, the sidewall of the countersunk slot hole includes a bottom face and two side faces symmetrical to each other, thereby forming a U-shaped structure in which three sides of the sidewall are closed and one side is open, and when the nut is placed in the U-shaped structure and is positioned by the bottom face and the two side faces, the hole of the nut is exactly aligned with the through hole.

2. The self-locking structure of threaded connection according to claim 1, wherein the countersunk slot hole further comprises a rib which protrudes from an outer end of the bottom surface to cover a part of the countersunk slot hole with the aim of being a axial limit stop for the nut.

3. The self-locking structure of threaded connection according to claim 1, wherein the step is a die-casted step molded through die-casting, and the countersunk slot hole is integrally die-casting molded with the step.

4. The self-locking structure of threaded connection according to claim 3, wherein the die-casted step is molded by castable metallic materials.

* * * * *